Figure 1:
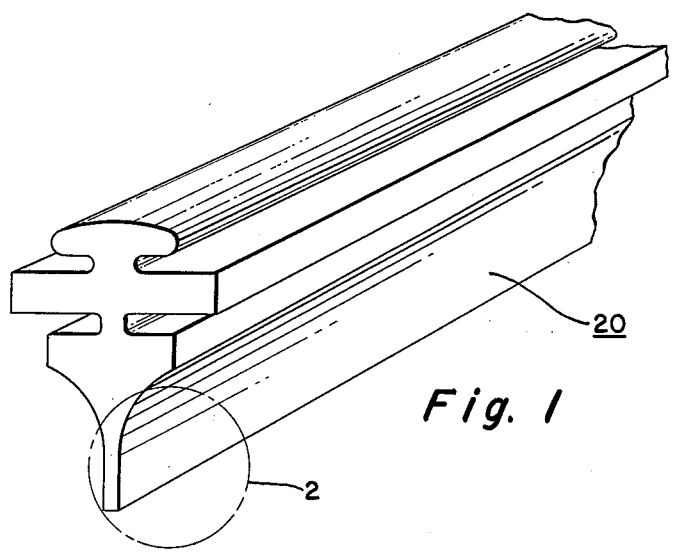

March 12, 1963  W. S. SYMBOLIK  3,080,596
SQUEEGEE TYPE WINDSHIELD WIPER BLADE
Filed Sept. 19, 1960

INVENTOR.
William S. Symbolik
His Attorney

3,080,596
SQUEEGEE TYPE WINDSHIELD WIPER BLADE
William S. Symbolik, Dayton, Ohio, assignor to General Motors Corporation, Detroit, Mich., a corporation of Delaware
Filed Sept. 19, 1960, Ser. No. 56,765
2 Claims. (Cl. 15—250.36)

This invention relates to windshield wiper blades or squeegees and is particularly directed to rubber blades having a low degree of frictional drag.

An object of the invention is to provide a windshield wiper blade or squeegee from rubber wherein the surface of the blade only is treated with a surface layer of friction reducing material and wherein the wiping edge of the blade is raw rubber.

A further object of the invention is to provide an improved windshield wiping blade or squeegee which has a low degree of frictional drag as compared with other blades of similar physical contours and formed from the same material wherein the frictional characteristics are obtained by a surface layer of molybdenum disulfide.

Further objects and advantages of the present invention will be apparent from the following description, reference being had to the accompanying drawings wherein preferred embodiments of the present invention are clearly shown.

Figure 2:
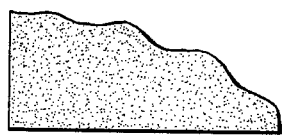

In the drawings:

FIG. 1 is an elevational view in perspective of one type of windshield wiper blade and FIG. 2 is a greatly enlarged view of the area encircled at FIG. 1 showing diagrammatically the molybdenum disulfide particles embedded in the surface.

The requirements that must be met by a windshield wiper blade or squeegee have become increasingly demanding during the past few years due to the advent of the curved windshield used on most automobiles. This curved windshield is not only of greater extent than the old-fashioned flat windshield but, due to the compound curvatures thereon, it is necessary that a windshield wiper be provided which will conform progressively to the contours of the windshield as it passes thereover during the wiping operation. This means that the windshield wiper blade must be longer than those previously used and, also, must be flexible and conformable to the complex curvatures of the windshield. In order to cause this to occur, pressure is applied intermediate the ends thereof to cause the blade to conform to the several contours of the windshield during the wiping operation.

This increased length and increased pressure obviously increases the frictional drag of the blade across the windshield whereby the power required to move the windshield wiper blade across the windshield during the wiping operation is vastly increased. These factors have thus increased the stress applied to the windshield wiper motor and have created numerous difficulties necessitating more powerful motors in order to obtain uniform wiping speed under all conditions.

It is apparent that, if the frictional drag between the rubber and glass can be reduced, the assembly will require less power to operate and, likewise, will improve the wiping action since, as the drag increases, there is a tendency toward chattering of the blade as it is pulled over the glass which sometimes results in a streaked windshield during the wiping cycle. Thus, a blade which does not grab and which has a lower degree of frictional drag than a conventional blade moves over the glass with less effort and wipes the windshield more uniformly and without streaks. Furthermore, as the frictional drag is reduced, the possibility of damage to the windshield is greatly reduced.

Windshield wiper blades of the general type discussed herein are shown in Wallis Patent 2,901,761. It is also to be understood that, in place of the rubber windshield wiper element shown in this patent, the element may be of the replaceable type which is releasably held by a backing so that the whole element can be easily removed and replaced if desired. In other words, the present invention is directed specifically to the wiping element per se and not the mounting assembly including the wiping element.

I have found that windshield wiper blades or squeegees made from a high grade, crepe rubber provides the greatest resiliency and life and that, if these blades are properly treated at least at the surfaces thereof, the wear of the blade is greatly reduced. I have also found that the frictional drag of the blade against the windshield is greatly reduced when the surface of the wiping element is treated with a lubricating compound and wherein the edge of the blade is raw rubber. In this connection the combination of a molybdenum disulfide coated blade with a raw rubber edge tends to improve wiping while reducing friction. Furthermore, the raw rubber edge due to its greater frictional drag, causes improved and quicker reversal of the blade at the end of each wiping stroke and generally improves the wiping action by reducing the power required to operate the blade thereby maintaining a more constant power requirement. Comparative tests show that elements made in accordance with the present invention exhibit up to 30% less frictional drag under identical wiping conditions when compared to identical blades without the molybdenum disulfide treated surface. These figures were obtained by measuring the power input to a motor operating the blade as a windshield wiper. In general, the improvement in reduction of frictional drag ranges between 25% and 30%.

Blades may be made by a number of processes and I specifically prefer to make them by the molding techniques shown in copending application S.N. 22,604, now Patent No. 3,035,297, filed April 15, 1960, and assigned to the assignee of the present invention. In this application blades are molded in tandem or in plural condition and are subsequently slit to provide the raw rubber edge. Of course, extruded sections may also be used which are cured on pans or in molds.

Referring to the drawings, a blade 20 as shown in FIG. 1 may be molded in tandem or in plural condition in a suitable mold. The molded material is cured for about 2½ minutes at 287° F. whereas the optimum cure requires about 10 minutes. After this partial cure is obtained the blade assembly is removed from the mold and has its entire surface dusted with molybdenum disulfide powder having a particle size of not over 62 microns and a softness rating preferably of from about 1 to 1½ mohs. These figures being exemplary of commercially available molybdenum disulfide powder.

The dusted blades are next placed in a hot air oven at about 300° F. for a post cure wherein the time of treatment varies from 3 to 6 hours. During this period the rubber compound completely cures and molybdenum disulfide particles on the surface thereof become partially imbedded and bonded to the material of the blade.

Thereafter the blades are slit to expose the raw rubber edge.

Where the cross sectional shape of the blade is of simple design it is possible to remove the blades from the mold, dust them with molybdenum disulfide powder, replace them in the mold, close the mold and again cure the material in the mold at 287° F. for an additional 8 to 10 minutes. When this procedure is followed it is apparent that due to pressure applied to the particles of molybdenum disulfide they are more firmly imbedded in the surface of the blade. It is apparent when a cross sectional shape of the blade is complicated that it is difficult to replace the blade in the mold and therefore the other procedure noted above is more practical. Also blades may be extruded and cured on pans or preforms may be extruded, dusted and then placed in molds for the entire cure which requires about 10 minutes at 287° F.

It is to be understood that the molybdenum disulfide coating is only necessary on that portion of the blade which contacts the surface to be wiped, however, for purposes of simplifying the procedure it is easier to coat the entire blade although it is to be understood that this is not necessary to enhance wipeability.

I have found that the results obtained from the present treatment cannot be duplicated by mixing molybdenum disulfide powder directly in the rubber compound since when the molybdenum disulfide powder is added to the compound it acts as a filler and reduces the physical properties of the compound when present in satisfactory amounts whereby the blade is not satisfactory. In this connection, I am fully aware of the use of soapstone, graphite, mica or similar materials used as fillers in rubber compounds proposed for subsequent use in windshield wiper blades. In each instance where sufficient amounts of the filler material is present to yield lubricating qualities, the physical properties of the compound are so reduced as to make the blade unfit for extended use.

In the present instance all of the useful qualities of molybdenum disulfide are obtained by surface coating while the physical properties of the rubber compound are not changed in any respect due to the thin surface layer of the molybdenum disulfide which is present. This is a very important and necessary feature of the invention since it is imperative that the resilient characteristics of the rubber be maintained if a satisfactory blade is to be produced.

The present invention may be used in connection with all manner of rubber compounds and one of such compounds has a recipe as follows:

|  | Parts |
|---|---|
| Master batch (see below) | 122.20 |
| N-cyclohexyl 2 benzothiazole sulfonamide (accelerator) | .65 |
| Tetramethyl thiuram disulfide (accelerator) | .16 |
| Sulfur (predispersed) | 2.05 |
| Dialkyl substituted paraphenylene diamine | 1.15 |
| Total | 126.21 |

The recipe for the master batch is formulated as follows:

|  | Parts |
|---|---|
| Washed and dried latex crepe rubber, #1 grade | 61.50 |
| 2 naphthalenethiol plasticizer | .20 |
| Zinc oxide (zinc-propionate coated) | 6.00 |
| Carbon black (fine thermal grade—4.1 acres per pound) | 30.50 |
| Stearic acid | .40 |
| Symmetrical dibetanaphthyl paraphenylene diamine (antioxidant) | .70 |
| Petroleum oil (softener) | .70 |
| Total | 100.00 |

The master batch is first mixed together in an internal mixer of the Banbury type at 200° F. to 225° F. for about 10 minutes, and is sheeted out on a mill into a one-eighth inch thick sheet. The sheet is then extruded through a screen to remove any foreign particles. This screened material is again sheeted and stored. This sheet is next added to the other ingredients on a mill to obtain a homogeneous dispersion of materials. All mills are water cooled and maximum temperatures are held below 200° F., preferably 195° F. Weighted slugs of this material are placed in a properly treated mold wherein a light coat of mold lubricant, for example a spray of liquid soap or the like, is applied to the surface of the mold. The slugs as previously stated are compression molded at 287° F. for about 2½ minutes. In this connection the precure may extend to 4 minutes although I prefer the lesser time treatment. Thereafter, the compound is dusted as noted and finish cured in a mold at 287° F. or in a hot air oven at 300° F.

In all instances the above recipe yields a highly resilient, age-resistant rubber material of high quality. It is apparent that deviations in the formulation with respect to accelerators, antioxidants and the like are well known in the art and form no part of the invention which is specifically directed to the surface treatment with molybdenum disulfide and to the method of obtaining adhesion of the material to the surface.

The invention set forth herein may be used in all types and designs of blades using varying types of supports. For example, the invention may be used in connection with the blades disclosed in Patents 2,920,335, 2,888,702, 2,634,446, 2,651,800 etc., and Serial No. 829,250, assigned to the assignee of the present invention.

While the embodiments of the present invention as herein disclosed constitute preferred forms, it is to be understood that other forms might be adopted.

What is claimed is as follows:

1. A squeegee type wiper blade for use in wiping glass surfaces and the like consisting of an elastomeric body portion, an integral wiping portion which normally contacts the glass surfaces during use thereof and a surface layer only on said wiping portion consisting of particles of molybdenum disulfide bonded to the surface of said elastomeric portion.

2. A squeegee type wiper blade for use in wiping glass surfaces and the like consisting of an elastomeric body and a lubricating surface layer only thereon consisting of particles of molybdenum disulfide bonded in situ to the surface of said elastomeric body wherein said molybdenum disulfide has a maximum particle size of not over 62 microns and a softness of from about 1 to 1½ mohs.

References Cited in the file of this patent

UNITED STATES PATENTS

| 2,383,734 | Pfleumer | Aug. 28, 1945 |
| 2,600,321 | Pyle | June 10, 1952 |
| 2,788,324 | Mitchell | Apr. 9, 1957 |
| 2,944,042 | Anderson | July 5, 1960 |

FOREIGN PATENTS

| 809,228 | Great Britain | Feb. 18, 1959 |